Aug. 1, 1967  H. PAPST  3,333,478

SWASH-PLATE MECHANISM FOR INTERNAL COMBUSTION ENGINES

Original Filed Sept. 9, 1963  2 Sheets-Sheet 1

Inventor:
Hermann Papst
by
Michael S. Striker

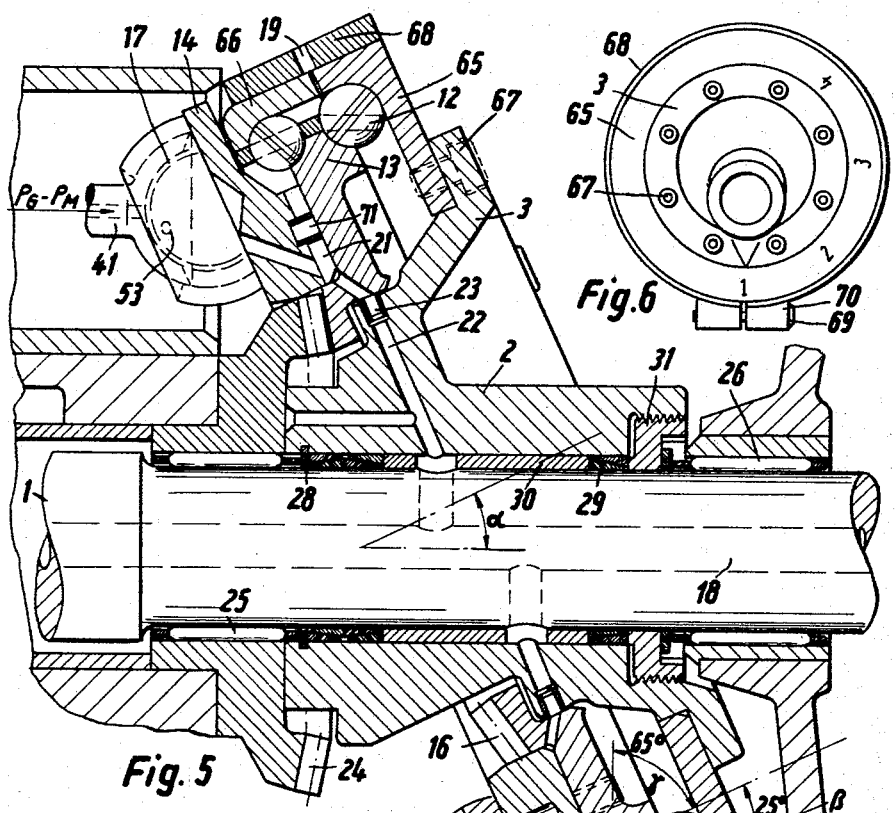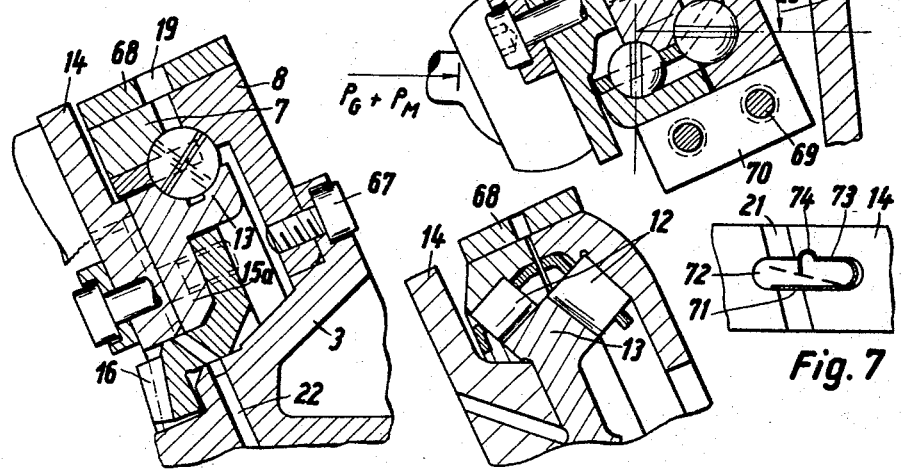

United States Patent Office 3,333,478
Patented Aug. 1, 1967

3,333,478
SWASH-PLATE MECHANISM FOR INTERNAL COMBUSTION ENGINES
Hermann Papst, St. Georgen, Black Forest, Germany
Continuation of application Ser. No. 307,446, Sept. 9, 1963. This application Aug. 15, 1966, Ser. No. 572,618
Claims priority, application Germany, Sept. 10, 1962, P 30,150; Mar. 14, 1963, P 31,358
17 Claims. (Cl. 74—60)

ABSTRACT OF THE DISCLOSURE

A high efficiency swash-plate mechanism for internal combustion engines suitable for operation at high speed and for transmission of great power and mainly comprising an elongated straight shaft, a swash-plate including an angle with the axis of the shaft and mounted on the latter for rotation therewith, an anti-friction bearing having an outer race fixedly connected to the swash-plate, an inner race and rolling members between the inner and the outer race, and a wobble ring fixed to the inner race coaxially therewith, in which the anti-friction bearing forms the only means for mounting the wobble ring, and wherein the straight shaft extends through the swash-plate and the wobble ring. The mechanism includes further rotation preventing means including a first engaging member mounted on the wobble ring and the inner race and a second engaging member movably engaging the first engaging member in such a manner as to prevent rotation of the wobble ring and inner race while permitting free tilting movement of the same.

---

Figure 1:
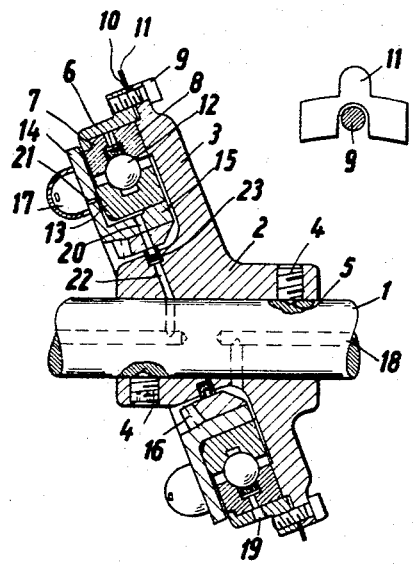

The invention relates to internal combustion engines with swash-plate mechanism.

This application is a continuation of Ser. No. 307,446, filed Sept. 9, 1963, now abandoned.

Internal combustion engines including swash-plate mechanisms have been proposed heretofore, but have not as yet come into general use. In previously proposed arrangements the moving masses of the pistons, connecting rods, etc., as well as in particular the mass of the swash-plate together with its associated bearing members gyrating in space produced excessively high stresses on the wobble bearings. It was not possible, therefore, to produce either a sufficiently high speed of rotation, adequate power or sufficient reliability.

It is an object of the invention to provide internal combustion engines with swash-plate mechanism that can operate with high speed of rotation, adequate power and sufficient reliability.

One of the principal objects of the invention is to reduce the inertial forces arising in swash-plate mechanisms and thus to reduce the mechanical demands upon the individual components. Therefore it is a still further object of the invention to provide a swash-plate mechanism having components in which even at increased speeds of rotation no impermissibly high stresses are induced.

Further objects and advantages of the invention are directed to the shape of the components, aiming to reduce the maximum stresses appearing at critical positions, so that the formerly unsatisfactory working life is increased.

It is a still further object of the invention to improve the lubrication, so that the reliability of the mechanism is still further increased.

The invention consists in novel features and combinations hereinafter described and particularly pointed out in the appended claims.

Further objects and advantages of the invention which are directed to the reduction of the wear and tear will be more fully understood from the following description taken in connection with the accompanying drawings of embodiments of the invention.

According to the present invention there is provided a swash-plate mechanism for internal combustion engines including a rotating swash-plate which carries, at least in part by means of an anti-friction bearing, a wobble ring secured against rotation by means of bevel gears, in which said wobble ring is secured to the inner race of said anti-friction bearing and that race of the bearing which is secured to the swash-plate externally surrounds said inner race with the rolling members.

It is advantageous for the inner bearing race and the anti-rotation bevel gear to be constructed from a single element. In some cases it will be useful to combine the inner bearing race and the anti-rotations bevel gear to a constructional unit by clamping both between flanges.

According to a preferred embodiment of the invention the outer race of the bearing, or its mounting, are so constructed as to yield resiliently, so that the piston pressure is uniformly distributed over the rolling members of the anti-friction bearing.

Preferably the housing for the outer race of the bearing is formed as a compression ring, with a releasable split connection, so that not only are the inertial stresses reduced, but also the anti-friction bearing may be particularly easily assembled to be free from play. If appropriately positioned, the split connection of the compression ring may also serve to balance the wobble bearing. In this way the wobble bearing can be adjusted before it is inserted into the engine.

To increase the bearing life it is desirable for the points of maxima pressure to be shifted from time to time to different locations on the outer race. If the fastening screws are uniformly distributed, this is easily achieved by repositioning of the outer race.

It has been determined that for particular values of the angles between the direction of thrust of the rolling members of the anti-friction bearing and the axis of symmetry of the wobble bearing a particularly low loading on the rolling members and thus a further increase in bearing life may be produced. To this end the direction of thrust of the rolling members which take the main stress should include with the axis of the wobble bearing an angle less than that which the direction of thrust of the rolling members which take the auxiliary stress makes with the same axis. The stresses imposed on the bearing are then taken most advantageously on the average for all cases of loading at different speeds of rotation.

The resolution of forces on the rolling member which takes the load at the upper dead point results in a thrust in the plane of the wobble ring. This is suitably resisted by the rolling member at the lower dead point, the thrust being taken at the same angle. The inertial forces, increasing rapidly at higher speeds, with the moderate gas forces added thereto at the lower dead point, are thus taken directly in the direction of thrust of the rolling members.

It has been found that the angle between the direction of thrust of those rolling members which receive the main thrust and the axis of symmetry of said wobble ring should amount to at least 15°, preferably to some 25°, while the angle between the direction of thrust of those rolling members which resist the auxiliary thrust and said axis of symmetry of said wobble ring should amount to at least 40°, preferably to 65°.

To further reduce the inertial forces it is advantageous for the connecting rod big-end pivots to be formed as approximately hemispherical shells, which are secured to the wobble ring preferably by spot welding.

It is suitable for oil under pressure to be led to the bearing by way of a slotted ring resiliently pressed against the inner race of the wobble bearing.

To ensure correct distribution of the oil under pressure to the individual bearing points it is suitable to have overpressure valves built into the supply channel to the wobble ring over-pressure valves which serve to ensure that the big-end bearings are always lubricated at a definite pressure.

It may be pointed out at this point that the arrangement according to the invention entails the remarkable advantage to make swash-plate motors reliable even when operated with high power at very high speeds. Since the axial arrangement of cylinders possible with a swashplate mechanism yields great advantages in simplified construction and reduced weight it thus becomes possible to obtain power:weight rations considerably in excess of those usual for conventional crank-drive motors.

Figure 2:
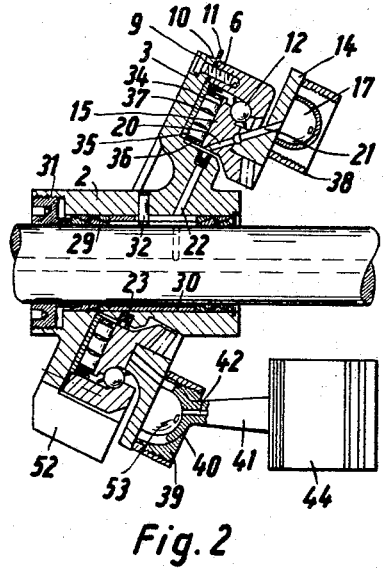
Figure 3:
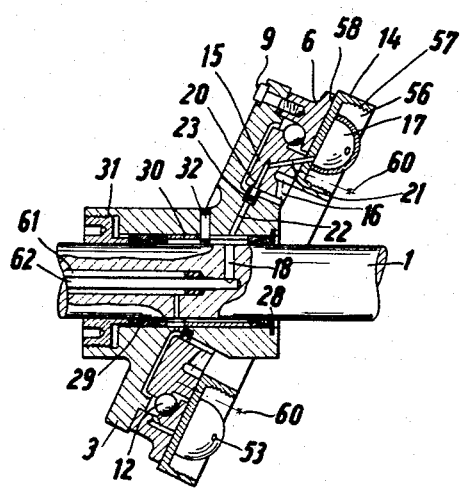
Figure 4:
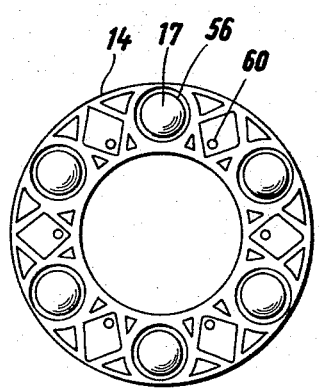

The invention will now be more particularly described with reference to the accompanying drawings comprising FIGURES 1 to 9, in the several figures of which like components are designated by like reference numerals and in which:

FIGURE 1 shows a longitudinal section through one embodiment of a swash-plate asembly in accordance with the invention using a simple so-called four-point bearing, FIGURE 2 shows a longitudinal section through an embodiment of a swash-plate assembly in accordance with the invention in which the main streses are carried by a roller bearing, FIGURE 3 shows a longitudinal section through a swash-plate assembly in which the main stresses are taken by a plain sliding bearing, FIGURE 4 is a plan view of the wobble ring of a six-cylinder motor including the present invention, FIGURE 5 shows a longitudinal section through another embodiment of swash-plate assembly in accordance with the present invention, making use of two ball bearings of equal outside race diameter held together adjustably but without play by a compression ring, FIGURE 6 is a plan view of an outer bearing race with a mounting which is displaceable with respect to the swash-plate such as is advantageously used in mechanisms according to the present invention, FIGURE 7 is a detail showing the construction of an over-pressure valve such as may be used to allow oil to pass to the anti-friction bearing only above a minimum pressure, FIGURE 8 is a longitudinal section through a variant of the embodiment of FIGURE 5, making use of a four-point bearing secured by a compression ring, and FIGURE 9 is a partial longitudinal section through another variant of the embodiment of FIGURE 5, using taper roller bearings.

In the embodiment of a swash-plate assembly shown in FIGURE 1 the outer race of the anti-friction bearing is assembled to the swash-plate which is secured to the motor shaft. The wobble ring carrying the big-end pivots is assembled to the inner race of the bearing which, because of its smaller diameter as compared with the outer race, possesses a substantially diminished mass. In addition this mass lies at a lesser distance from the axis of gyration. Thus not only is the mas reduced but its radius of gyration also is diminished, which correspondingly lessens the loading on the bearing due to inertial forces.

The hub 2 of the swash-plate 3 is secured to the shaft 1 by means of several spaced grub-screws such as those shown at 4, 4 entering dimples 5 in the shaft. The swashplate 3 carries the two halves 7, 8 of the split outer race of a ball-bearing which are secured to it by a housing ring 6. With the aid of aligning shims 11, the screws 9 which hold the housing ring 6 to the swash-plate permit the adjustment of the gap 10 and thus the shake-free alignment of the wobble bearing. The inner portion 15 of the wobble ring 14 is tightly fitted to a bevel gear 16 which is used in known manner to prevent rotation of the wobble ring. The wobble ring is also provided with big-end pivots 17 for the connecting rods. These are formed as drawn or pressed hemispherical shells which are conveniently secured to the wobble plate by spot welding.

Lubrication and also cooling of the bearing is effected by oil fed under pressure through a bore 18 in the shaft 1 and thence through a drilled channel 22, an oil ring 23 and a further channel to the bearing. An opening 19 in the housing ring, through which oil may escape from the bearing, is provided in order to ensure a continuous flow. The inner portion 15 of the wobble ring 14 is also pierced by a drilled channel 20 connecting with a lateral channel 21 through which oil under a pressure of some 3–6 atmospheres may pass to the hollow connecting rod pivots 17. The oil ring 23, by which the oil under pressure passes from channel 22 to the wobble plate is of similar construction to an oil stripper ring, being of channel section pierced by slit openings.

The inner race 13 of the ball bearing is secured, if necessary by the use of adhesives or welding, to the inner portion 15 of the wobble ring 14.

It has been found that the angle $\beta$ which the direction of thrust of the rolling members of the anti-friction bearing includes with the axis of the wobble ring, should amount to at least 15° and preferably to 25°. On the other hand, the angle $\gamma$ between the centrifugal forces acting on the rolling members and the same axis should amount to at least 40° and preferably to 65°, so that the sum of these two angles amounts to at least 70° and preferably to 90°. (See FIG. 5.)

FIGURE 2 shows an embodiment of the invention in which the forces are transmitted by a roller bearing, while a steep-angled ball bearing 6, 12, 15 is used to secure the wobble ring against radial and axial movement.

The hub 2 of the swash-plate 3 is secured to the shaft 1 under high frictional pressure by means of annular wedges 29, a distance tube 30 and an eyebolt 31. The pin 32 fixed the position of the distance piece 30 in a groove which carries oil into the channel 22. The swash-plate 3 carries a housing ring 6 which also forms the outer race of an angular thrust ball bearing. This race is secured to the swash-plate by screws 9 equiangularly disposed around its periphery so as to permit replacement of the race in a number of different positions. This is described later in connection with FIGURE 6.

Alignment shims 11 are inserted in the gap 10 between housing ring 6 and swash-plate 3 to reduce to a required minimum the play in the bearing. In addition to forming the inner race for the angular contact ball bearing the inner portion 15 of the wobble ring 14 is provided with a planar surface 34 upon which run axially disposed rollers 35, which are carried in a cage 36 and transmit the main stress to the annular disc 37. Disc 37 is mounted to have a small amount of radial play, so that in course of time it wanders and the pressure points are thus distributed over its surface. A bevel gear 16 is formed in one with the inner portion 15 of wobble ring 14. An oil ring 23 fits against an internally ground surface of portion 15 of the wobble ring.

To the outer portion of the wobble ring 14 are fixed threaded rings 38 with bearing bushes 39 screwed in. By this a number of hemispherical shell pivots 40 are secured upon which bear the big ends of the connecting rods. For the sake of simplicity in illustration one only of these rods is shown at 41. It will be seen that the big-end cup 40 of the rod bears upon a pivot shell and that these shells are pierced by centrally disposed holes as at 53, through which oil may pass into the bore of the hollow connecting rod when the piston 44 is at the middle of its stroke. The oil seal ring 23 allows the pressure in the hollow piston rods to be raised to some 6 atmospheres. A balance weight 52 is secured to the swash-plate 3.

FIGURE 3 shows an arrangement in which the main forces are transmitted by a plain sliding bearing 58, while the angular thrust ball bearing transmits only the small radial forces. This arrangement is particularly suitable for high speeds of rotation. In this embodiment the hemispherical big-end pivots, such as 17, are arranged in recesses such as 56 which are internally threaded as at 57 to accept the outer bearing shells (not shown). A plane surface formed on the main portion 14 of the wobble ring bears at 58 against a corresponding surface formed on a ring 6 secured to swash-plate 4, which also forms the outer race of a diagonal-thrust ball bearing. The wobble ring is secured to the inner race of the diagonal-thrust ball bearing by means of screws at positions such as that indicated by broken line 60. Lubricating oil is fed to the big-end bearing 17 by way of a pipe 62 situated in the bore 61 of the hollow shaft 1, while oil is fed to the balls of the diagonal-thrust bearing by way of the bore 61 itself.

The wobble ring 14 may advantageously be made of a titanium alloy or aluminium alloy having suitable low-friction properties, so that good running characteristics for the swash mechanism may be obtained.

FIGURE 4 shows a plan view of a wobble ring suitable for use in the swash-plate mechanism of a six-cylinder motor. The big-end bearings 17 are shown situated in recesses 56 and the positions of the fixing screws 60 are also indicated.

In the embodiment of the invention illustrated by FIGURE 5 two ball races 65 and 66 of equal diameter encompass the inner race with the balls. Race 65 is secured by means of screws 67 to the swash-plate 3 and the two races are fastened together by means of a compression ring 68 which is clamped about them by means of a screw 69. The two races 65 and 66 then keep the bearing completely free from play and provide an ideally simple adjustment. The clamping screw 69 and the enlargement 70 of the compression ring necessary for its inclusion serve at the same time as a counterweight to balance the swash-plate. They are therefore situated at that part of the swash-plate which lies closest to the shaft. Bevel gear 16 is engaged to stationary bevel gear 24. Within the bevel gear 24 there is arranged bearing 25 which together with another bearing 26 carry the shaft 1.

The race 65 is preferably constructed with a plate portion of small thickness connected to the periphery of swash-plate 3 so as to be resiliently yielding a little in axial direction, so that the loading imparted by the connecting rods is distributed over several neighbouring balls 12. By this means the peak loading on the balls situated directly beneath the big-end bearings is considerably reduced. This peak load is the critical demand on the bearing, and its reduction in this manner substantially increases again the life of the bearing.

As shown in FIG. 6, swash-plate 3 and outer race 65 are connected by screws 67 equally spaced from each other so that swash-plate and outer race may be assembled to each other in a plurality of angularly displaced positions, which can be checked by indicia, i.e., the numbers on the race and the "V" mark on the swash-plate.

FIGURE 7 shows a section through an over-pressure valve such as may conveniently be used in the oil channel 21, at the position indicated at 71 in FIGURE 5. Only when the designed pressure has been reached does the valve open to allow oil to pass to the balls 12. The valve shown consists of a U-shaped leaf spring 73, inserted in slot 72, transverse to oil channel 21. One end of said spring is located in a recess 74 in a slot so that the other end of the spring closes the oil channel until the pressure on it is sufficient to overcome its resilience.

FIGURE 8 shows a modification of the wobble bearing shown in FIGURE 5, in which the pressure is transmitted over a kind of four-point bearing. The race 8 corresponds generally in function to the race 65 of FIGURE 5 and in like manner is in part made of a section thin enough to allow it to yield resiliently in the axial direction. The compression ring 68 holds the two races 7 and 8 together. Between swash-plate 3 and bevel gear 16 there is only a very narrow gap to keep the leakage of pressure oil small. The inner part 15a of the inner race 13 is fixed between bevel gear 16 and wobble ring 14. But it is also possible to fix bevel gear 16 between wobble ring 14 and inner part 15a of the inner race 13.

FIGURE 9 shows a partial cross-section through an embodiment in which two anti-friction bearings provided with taper-roller 75 replace the ball races of FIGURE 5.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. A high efficiency swash-plate mechanism for internal combustion engines comprising, in combination, an elongated straight shaft; a swash-plate including an angle with the axis of said shaft and mounted on the latter for rotation therewith; an anti-friction bearing having an outer race fixedly connected to said swash-plate, an inner race and rolling members between said inner and said outer race; a wobble ring fixed to said inner race coaxial therewith, said anti-friction bearing forming the only means for mounting said wobble ring and said straight shaft extending through said swash-plate and said wobble ring; rotation preventing means including a first engaging member mounted on said wobble ring and said inner race and a second engaging member movably engaging said first engaging member in such a manner as to prevent rotation of said wobble ring and inner race while permitting free tilting movement of the same.

2. A mechanism as set forth in claim 1, wherein said first engaging member and said second engaging member are meshing bevel gears.

3. A mechanism as set forth in claim 2, wherein said first bevel gear and said inner race are integral with each other.

4. A mechanism as set forth in claim 1, wherein said outer race is mounted on said swash-plate in the region of the outer periphery of the latter so as to be resiliently yieldable in axial direction along the whole periphery thereof.

5. A high-efficiency swash-plate mechanism for internal combustion engines according to claim 1, and including a plain bearing resisting the main thrust, said rolling members taking the radial thrust.

6. A mechanism as set forth in claim 1 and including a plurality of screws for securing said outer race to said swash-plate, said screws being arranged uniformly spaced from each other along a circle coaxial with said outer race so that outer race and swash-plate may be connected to each other in a plurality of different angular positions, and including indicia on said outer race and said swash-plate for indicating the positions at which swash-plate and outer race are assembled with each other.

7. A mechanism as set forth in claim 1, wherein said second engaging member is a bevel gear.

8. A high-efficiency swash-plate mechanism for internal combustion engines according to claim 1, wherein said rolling members are arranged in two groups, one group of rolling members mainly receiving the main thrust and the other group of rolling members mainly resisting the centrifugal thrust in which the directions of thrust of the rolling members include with the axis of symmetry of said wobble ring acute angles, the angle between the direction of thrust of the rolling members of said one group and said axis amounting to at least 15° and preferably 25°, while the angle between the direction of thrust of the rolling members of said other group and said axis is amounting to at least 40° and preferably to 65°.

9. A high-efficiency swash-plate mechanism for internal combustion engines according to claim 8, in which the sum of said two angles amounts to at least 70° and preferably to 90°.

10. A high-efficiency swash-plate mechanism for internal combustion engines according to claim 8, in which the angle between the direction of thrust of the rolling members of said other group differs from the angle between the axis of symmetry of said wobble ring and the axis of said shaft by not more than 15°, and is preferably equal to said angle.

11. A mechanism as set forth in claim 1 and including a compression ring having releasable closure means surrounding said outer race coaxial therewith to eliminate play from the race.

12. A mechanism as set forth in claim 11, wherein said closure means of said compression ring is located at that part of said swash-plate which lies nearest to the axis of said shaft.

13. A mechanism as set forth in claim 1 and including a plurality of connecting rod pivot bearings including substantially hemispherical shells fixedly connected to said wobble ring, said hemispherical shells having convex sides facing away from said wobble ring and adapted to cooperate with corresponding concave surfaces on connecting rods.

14. A mechanism as set forth in claim 13, wherein said swash-plate includes a hub and wherein said hub of said swash-plate and said wobble ring are each formed with a substantially radial bore, and including a grooved spring ring located between said hub and said wobble ring and with the groove thereof communicating with said bore in said hub and said wobble ring for feeding oil under pressure, fed to said bore in said hub through a bore in said shaft, from said hub to said wobble ring.

15. A mechanism as set forth in claim 14 and including a channel communicating at one end with said bore in said wobble ring and at the other end with the interior of said hemispherical shell, and an opening formed in said hemispherical shell so disposed that oil may pass therethrough into oil channels formed in cooperating connecting rods when pistons connected to the connecting rods are in a mid-stroke position.

16. A mechanism as set forth in claim 15 and including an overpressure valve in said channel between said slit and the interior of said hemispherical shell.

17. A mechanism as set forth in claim 16, wherein an elongated groove is formed in said wobble ring intersecting said channel and wherein said overpressure valve consists of a U-shaped leaf spring fitted in said groove and having one arm extending across said channel.

References Cited
UNITED STATES PATENTS

| | | | |
|---|---|---|---|
| 1,152,004 | 8/1915 | Canton | 74—60 X |
| 1,659,374 | 2/1928 | Robson | 74—60 |
| 1,714,145 | 5/1929 | Sperry | 74—60 |
| 1,781,130 | 11/1930 | Shaff | 74—60 |
| 1,885,323 | 11/1932 | Duryea | 74—60 |
| 2,231,100 | 2/1941 | Wahlmark | 74—60 |
| 2,364,004 | 11/1944 | Shaff | 74—60 |
| 2,398,486 | 4/1946 | Woods | 74—60 |
| 2,424,660 | 7/1947 | Howard | 74—60 |
| 2,475,295 | 7/1949 | Sherman | 74—60 |
| 2,757,612 | 8/1956 | Shaw | 103—162 |

MILTON KAUFMAN, *Primary Examiner.*